Sept. 18, 1951 W. H. WOLOWITZ 2,568,427
STAMP CARRIER CARD
Filed Nov. 29, 1948 2 Sheets-Sheet 1
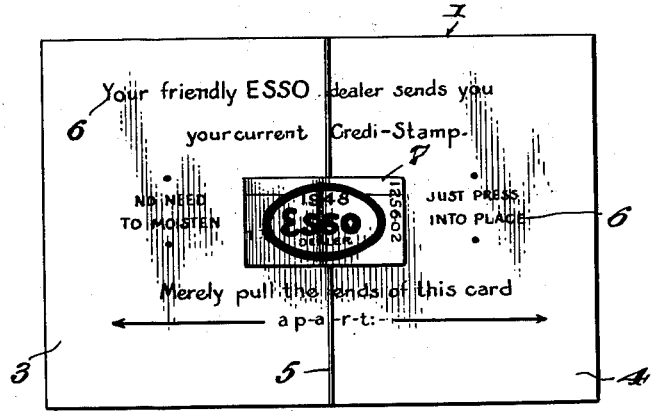
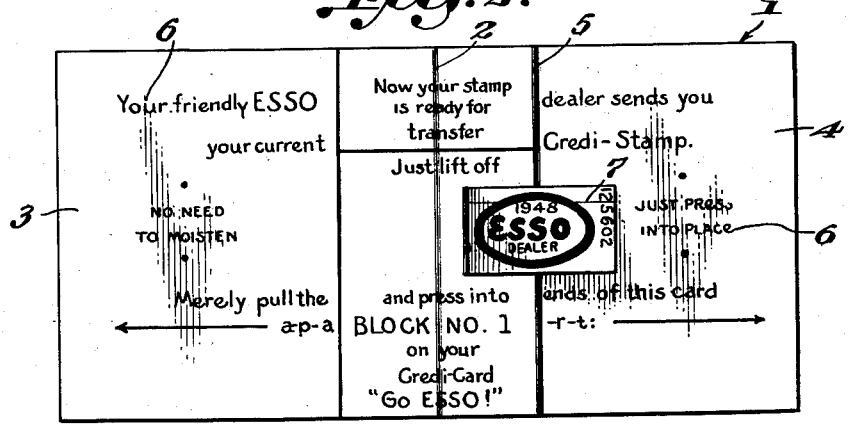
 
Inventor;
William H. Wolowitz,
By Robert C. Dennison
Atty.

Sept. 18, 1951    W. H. WOLOWITZ    2,568,427
STAMP CARRIER CARD

Filed Nov. 29, 1948    2 Sheets-Sheet 2

Inventor:
William H. Wolowitz,
By Robert C. Dennison
atty.

Patented Sept. 18, 1951

2,568,427

UNITED STATES PATENT OFFICE 2,568,427

STAMP CARRIER CARD

William H. Wolowitz, Washington, D. C.

Application November 29, 1948, Serial No. 62,577

2 Claims. (Cl. 216—1)

1

The present invention is a continuation-in-part of my application Serial No. 7,642, filed February 11, 1948.

The instant invention relates to a carrier card for a pressure sensitive credit stamp such as is used in conjunction with the "credi-card" disclosed in the aforesaid application.

A further object of the present invention is to provide a carrier card for a pressure sensitive credit stamp which also functions as a holder for facilitating the application of the stamp in its proper space on the "credi-card."

Still a further object of the present invention is to provide a mount for the pressure sensitive credit stamp which will afford an advertising medium for the particular concern issuing the stamp.

Another important object is to provide a combined stamp carrier card and holder wherein certain advertising indicia on the carrier card is normally concealed from view, such indicia being exposed to view when the carrier card is actuated to partially disengage the stamp from the carrier card just prior to applying the stamp onto the "credi-card."

Other objects and advantages of the present invention will become apparent from the following description when taken in connection with the accompanying drawings.

In the accompanying drawings, forming a part of this specification, and in which like reference characters designate corresponding parts throughout the several views:

Figure 1 is a front elevation of the card showing the credit stamp attached thereon with the indicia on the central portion of the card concealed from view, by reason of the card having its intermediate portion disposed in a folded condition.

Figure 2 is a similar view showing the stamp partially disengaged from the said card, and the latter extended to expose to view the advertising indicia appearing in the central portion of the card.

Figure 5 is a front elevation of the pressure sensitive credit stamp.

Figure 6 is a rear view of the stamp, and

Figure 7 is an edge elevation of my combined

Figure 3:
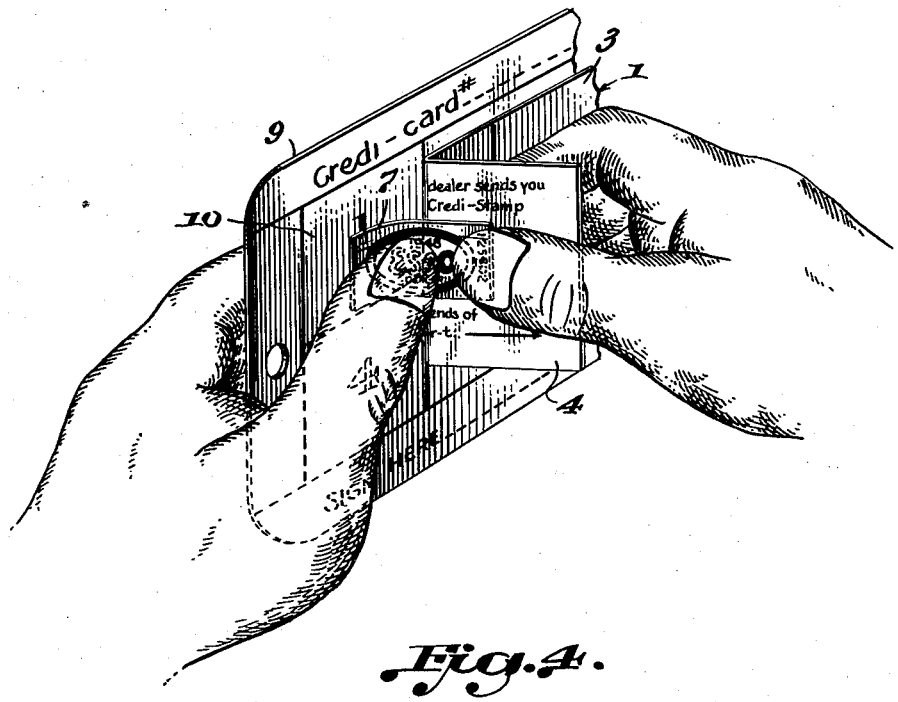
Figure 3 is a perspective view illustrating the manner in which the pressure sensitive credit stamp is applied to the "credi-card."

2 stamp carrier card and holder and the stamp attached thereto.

In the drawings, the combined stamp carrier card and applicator is denoted generally by the numeral 1, the same comprising a rectangular-shaped card formed of stiff paper, although the same may be formed of any other suitable material.

The card is formed with a central transverse fold or crease 2 forming the two sections 3 and 4. An additional transverse fold or crease 5 is formed in the section 4, adjacent the central fold or crease 2, the purpose of which folds and creases will be presently described.

Suitable advertising and instructive indicia as to how to use the card is printed on the front face of the card as clearly indicated at 6 in the drawings.

The credit stamp used in conjunction with the "credi-card" disclosed in my copending application, Serial No. 7,642, and which stamp is mounted on the carrier card 1, is shown at 7. The front face of the stamp bears certain identifying indicia, such as the name of the particular merchant or store issuing the stamp and other data, fully set forth in my aforesaid application.

The rear face of the stamp carries a pressure sensitive adhesive coating 8 of any well known character.

The credit stamp is applied across the fold 5 of the card 1 and adheres to the adjacent portions of the sections 3 and 4, in the manner shown in Figures 1 and 7 of the drawings. In this manner, the indicia on the central portion of the card is concealed from view, with the inner portion of the section 4 overlying the inner portion of the section 3.

With the credit stamp thus attached on the card, the same can be supplied to the customer to whom the "credi-card" was initially issued.

Figure 4:
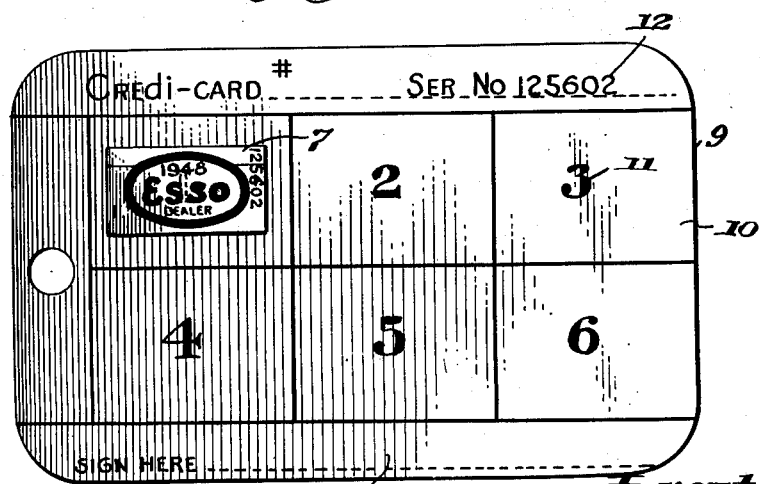
Figure 4 is an enlarged front elevation of the "credi-card" showing one of the spaces thereon occupied by one of the pressure sensitive credit stamps.

The "credi-card" is shown at 9 in Figures 3 and 4, the same comprising a rectangular-shaped card which may be formed of plastic, cardboard or any suitable material.

The card is marked off to provide a number of spaces or blocks 10, each of which bears a predetermined numeral indicated at 11. The number of spaces or blocks may vary, depending on the size thereof.

At the top the "credi-card" bears the serial number 12, assigned to the user of the "credi-card" and at the bottom, a space 13 is provided for the user's signature as a further means of positive identification.

The customer, upon receiving the carrier card 1 with the credit stamp carried thereon, grasps the outer end portions of the folded sections 3 and 4 and pulls outwardly in opposite directions.

This will automatically cause the sections to be extended and by reason of the fold 5, and will cause the portion of the stamp initially adhering to the section 3 to become disengaged therefrom while the other portion of the stamp will remain attached to the section 4.

When the sections of the carrier card are in their fully extended position, the same will lie in the same plane and the indicia carried by the central portion of the card will then be exposed to view, as clearly illustrated in Figure 2.

The carrier card 1 may now be employed as a holder for facilitating the application or transfer of the credit stamp in the proper space or block 10 of the "credi-card" 9.

In this connection the section 3 is folded back along the fold line 5 against the rear face of the section 4 and the thus folded carrier card is placed and held against the "credi-card" with the free portion of the credit stamp 7 positioned over its proper space 10. The stamp is then applied by pressure of the other hand against the free end portion of the stamp while the outer end portion of the section 3 is pulled outwardly, thus disengaging the carrier card from the stamp and permitting the latter to be properly attached to the "credi-card."

While I have shown the preferred embodiment of my invention, it is to be understood that various changes in the size, shape and arrangement of parts may be resorted to without departing from the spirit of the invention and the scope of the appended claims.

Having thus described my invention, what I claim is:

1. In combination with a stamp having its rear surface provided with a pressure sensitive adhesive, a carrier card for the stamp comprising a sheet of paper marked by lines extending between the upper and lower edges to provide end sections and a central indicia-bearing section between the end sections, said card being folded midway the width of said central section and then back upon itself along one of said lines to conceal the indicia upon the folded central section and disposing the inner end edges of the end sections in registry with each other, one end section being disposed in overlapping relation to the folded central section and having a portion projecting outwardly therefrom, and said stamp being disposed in bridging relation to the meeting inner edges of said end sections and having its rear surface pressed into adhering engagement with the front surfaces of the inner end portions of the end sections and securing the central section in its folded condition, the said end sections being of a length adapting them to be grasped by their outer end portions and subjected to longitudinal pull for detaching the stamp from one end portion, while the stamp remains in adhering engagement with the other inner end portion of the card and projects from the inner edge portion thereof.

2. In combination with a stamp having its rear surface coated with a pressure sensitive adhesive, a carrier card for the stamp comprising a sheet of paper folded intermediate its length and then back upon itself to provide a folded intermediate portion and end portions projecting laterally from the folded intermediate portion, said stamp being applied in adhering engagement with the front faces of the inner end portions of said end sections and in exposed and bridging engagement therewith and being detachable from one end portion by a pull exerted longitudinally upon both of said end sections, while remaining in adhering engagement with the inner end portion of the other end section.

WILLIAM H. WOLOWITZ.

REFERENCES CITED

The following references are of record in the file of this patent:

UNITED STATES PATENTS

| Number | Name | Date |
|---|---|---|
| 1,834,170 | Mohr | Dec. 1, 1931 |
| 2,468,619 | Franke | Apr. 26, 1949 |

FOREIGN PATENTS

| Number | Country | Date |
|---|---|---|
| 396,299 | Great Britain | Aug. 3, 1933 |